United States Patent

Hayashi et al.

[11] Patent Number: 5,540,450
[45] Date of Patent: Jul. 30, 1996

[54] RUBBER PLUG FOR A WATER-PROOF CONNECTOR

[75] Inventors: Hiroyuki Hayashi; Shigekazu Wakata; Eiji Saijo; Masahiko Aoyama, all of Yokkaichi, Japan

[73] Assignee: Sumitomo Wiring Systems, Ltd., Mie, Japan

[21] Appl. No.: 305,024

[22] Filed: Sep. 13, 1994

[30] Foreign Application Priority Data

Sep. 20, 1993 [JP] Japan .................................. 5-257651
Dec. 23, 1993 [JP] Japan .................................. 5-347471

[51] Int. Cl.⁶ .............................. F16J 9/08; H02G 3/18
[52] U.S. Cl. ............... 277/205; 277/207 R; 277/212 C; 174/65 G; 174/152 G; 439/275; 439/279; 439/587
[58] Field of Search ............................ 277/168, 205, 277/206 A, 212 R, 212 C, 152, 165, 215, 207 R; 439/587, 589, 274, 275, 279; 174/152 G, 153 G, 65 G

[56] References Cited

U.S. PATENT DOCUMENTS

| | | | |
|---|---|---|---|
| 2,211,780 | 8/1940 | Jacobs | 174/152 G |
| 2,465,175 | 3/1949 | Schwarz et al. | 277/205 |
| 2,897,533 | 8/1959 | Bull et al. | 277/212 |
| 2,945,203 | 7/1960 | Quacbenbush | 439/589 |
| 3,206,075 | 9/1965 | Scholle | 277/205 |
| 3,243,206 | 3/1966 | Samer | 174/65 G |
| 3,424,857 | 1/1969 | Miller et al. | 277/178 |
| 3,787,796 | 1/1974 | Barr | 439/279 |
| 3,995,332 | 12/1976 | Forchini et al. | 227/178 |
| 4,214,802 | 7/1980 | Otani et al. | 439/275 |
| 4,643,506 | 2/1987 | Kabler | 439/587 |
| 4,793,451 | 12/1988 | Taylor | 277/205 |
| 5,305,903 | 4/1994 | Harde | 277/178 |

FOREIGN PATENT DOCUMENTS

| | | |
|---|---|---|
| 0553872A1 | 8/1993 | European Pat. Off. . |
| 0630073A3 | 12/1994 | European Pat. Off. . |
| 2415375 | 8/1979 | France . |
| 51-55392 | 4/1976 | Japan . |
| 3-156867 | 7/1991 | Japan . |
| 86/06883 | 11/1986 | WIPO . |

*Primary Examiner*—Daniel G. DePumpo
*Attorney, Agent, or Firm*—Oliff & Berridge

[57] ABSTRACT

A rubber plug for a water-proof connector has an inner cylinder and an outer cylinder. The rubber plug into which an electrical wire inserted and which is inserted into a cylindrical structure of the water-proof connector sealingly closes the gap between the electrical wire and the cylindrical structure. The inner cylinder is provided at a portion which is positioned near the opening of the cylindrical structure of the water-proof connector, for sealingly closing a gap between the electrical cylinder and the inner cylinder. The outer cylinder has an annular groove, and is provided outside the inner cylinder at the portion in such a manner that the outer cylinder surrounds said inner cylinder through the annular groove for closing a gap between the inner cylindrical surface of the cylindrical structure and the outer cylinder.

6 Claims, 4 Drawing Sheets

RUBBER PLUG FOR A WATER-PROOF CONNECTOR

BACKGROUND OF THE INVENTION

1. Field of the Invention

This invention relates to a rubber plug for a water-proof connector which sealingly closes the gap which may be formed between the connector housing and the electrical wire inserted into it.

2. Description of the Prior Art

A conventional rubber plug of this type is as shown in FIG. 7. That is, the rubber plug 50 comprises: a cylindrical plug body 51 which is fitted on an electrical wire; a plurality of outer annular lips 52 formed on the outer cylindrical surface of the cylindrical plug body 51; and a plurality of inner annular lips 53 formed on the inner cylindrical surface of the cylindrical plug body 51. The rubber plug 50 is inserted into the cavity 56 of a connector housing 55 from the right in FIG. 5 in such a manner that the outer annular lips 52 are sealingly pressed against the inner cylindrical surface of the connector housing 55 while the inner annular lips 53 are also sealingly pressed against the outer cylindrical surface of the electrical wire 54.

However, the above-described conventional rubber plug suffers from the following difficulty: When, as shown in FIG. 8, a force acts on the electrical wire 54 at the end of the cavity 56; i.e., at the opening of the connector housing 55, to bend the electrical wire 54 laterally of the latter 55 depending on the wiring arrangement, the wall of the rubber plug 50 is compressed by the electrical wire 54 on the side to which the latter 54 is bent, thus forming a gap between the inner cylindrical surface of the cavity 56 and the rubber plug 50, and a gap between the electrical wire 54 and the rubber plug 50. As a result, the connector is no longer water-proof; that is, water may enter the cavity 56.

SUMMARY OF THE INVENTION

In view of the foregoing, an object of the invention is to provide a rubber plug for a water-proof connector which will not impair the water-tightness of the connector even when a bending force is applied to the electrical wire connected thereto.

The foregoing object of the invention has been achieved by the provision of a rubber plug for a water-proof connector having an inner cylinder and an outer cylinder. The rubber plug into which an electrical wire inserted and which is inserted into a cylindrical structure of the water-proof connector sealingly closes the gap between the electrical wire and the cylindrical structure. The inner cylinder is provided at a portion which is positioned near the opening of the cylindrical structure of the water-proof connector, for sealingly closing a gap between the electrical cylinder and the inner cylinder. And the outer cylinder has an annular groove, ant is provided outside the inner cylinder at the portion in such a manner that said outer cylinder surrounds said inner cylinder through the annular groove for closing a gap between the inner cylindrical surface of the cylindrical structure and the outer cylinder.

The foregoing object of the invention has been achieved by the provision of another rubber plug for a water-proof connector into which an electrical wire inserted and which is inserted into a cylindrical structure of the water-proof connector to sealingly close the gap between the electrical wire and the cylindrical structure, the rubber plug having a taper surface at a portion positioned near the opening of the cylindrical structure. The taper surface is gradually larger in diameter towards the opening of the cylindrical structure, for pressing against the edge of the opening of the cylindrical structure.

In the rubber plug according to the present invention, the inner cylinder and the outer cylinder are separated from each other by the annular groove. Therefore, even when the electrical wire is bent to one side, the bending force is scarcely transmitted to the outer cylinder. Hence, the outer cylinder is scarcely compressed on the one side to which the electrical wire is bent, and a gap is scarcely formed between the inner cylindrical surface of the cylindrical structure and the outer cylinder on the other side which is opposite to the firstly mentioned one side to which the electrical wire is bent. Thus, the cylindrical structure into which the electrical wire has been inserted is held water-tight with the rubber plug of the invention.

In the case of the rubber plug according to the invention secondary described above, the taper surface of the rear end portion of the rubber plug is pressed against the edge of the opening of the cylindrical structure under high pressure. Hence, even when the electrical wire is bent, the rear end portion of the rubber plug is scarcely deformed by the compressing force due to the bending of the electrical wire on the side to which the electrical wire is bent; while on the opposite side the rear end portion of the rubber plug is scarcely spaced away from the edge of the opening of the cylindrical structure. As a result, a gap is scarcely formed between the taper surface of the rear end portion of the rubber plug and the edge of the opening of the cylindrical structure. The cylindrical structure into which the electrical wire has been inserted is held water-tight at all times.

The rubber plug of the invention is advantageous as follows: As was described above, the bending force applied to the electrical wire is scarcely transmitted to the outer cylinder, so that the inside of the cylindrical structure is held water-tight by the outer cylinder sealingly engaged with the latter. Thus, the water-proof connector with the rubber plug of the invention is high in water-tightness.

The rubber plug secondary described above has the following effect or merit: The taper surface of the rear end portion of the rubber plug is pressed against the edge of the opening of the cylindrical structure under high pressure. Hence, even when the electrical wire is bent, no gap is formed between the electrical wire and the cylindrical structure on the side which is opposite to the side to which the electrical wire has been bent. Thus, with the rubber plug simple in structure according to the invention, the water-proof connector can be maintained high in water-tightness at all times.

DETAILED DESCRIPTION OF THE PREFERRED EMBODIMENTS

Preferred embodiments of this invention will be described with reference to the accompanying drawings.

First Embodiment

Figure 1:
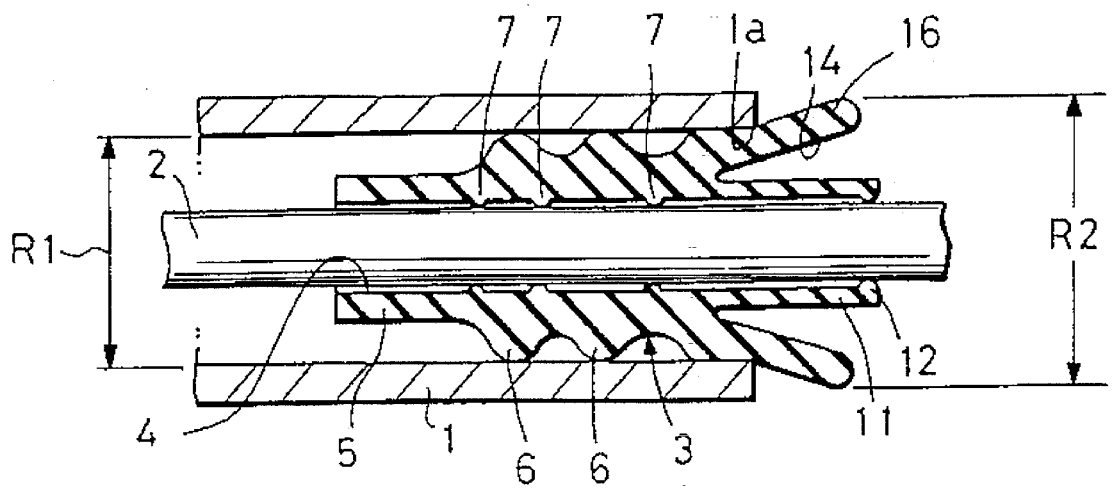
FIG. 1 is a sectional view showing a rubber plug engaged with a water-proof connector according to a first embodiment of this invention.

An example of a rubber plug for a water-proof connector, which constitutes a first embodiment of the invention, will be described with reference to FIG. 1. FIG. 1 shows the end portion of a connector housing through which an electrical wire is inserted into the connector housing. In other words, FIG. 1 shows the internal structure of a seal cylinder 1 provided for an electrical wire. A plurality of seal cylinders 1 are arranged side by side, which are communicated with cavities, respectively, which are coaxial with the seal cylinders.

An electrical wire 2 with a metal terminal (not shown) fixedly fastened to its top end portion is inserted into each of the seal cylinders 1. A water-proofing rubber plug 3 is mounted on the electrical wire 2 behind the metal terminal. The rubber plug 3 includes an end portion 5 which is compressed by crimping the metal terminal, so that the rubber plug 3 is fixedly mounted on the electrical wire 2.

The water-proofing rubber plug 3 will be described in more detail. The rubber plug 3 is substantially in the form of a hollow cylinder made of elastic synthetic rubber. The electrical wire 2 can be inserted into the hollow 4 of the rubber plug 3 in such a manner that it is substantially in close contact with the inner cylindrical surface thereof. Two outer lips 6 are formed on the outer cylindrical surface of the middle of the rubber plug in such a manner that they are spaced axially from each other. Each of the outer lips 6 is in the form of a ring protruded from the outer cylindrical surface of the rubber plug 3, and its outer peripheral portion is substantially round in section when not compressed, and its outside diameter is slightly larger than the inside diameter of the seal cylinder 1. Hence, when the rubber plug 3 is inserted into the seal cylinder 1, the outer peripheral portion is pressed against the inner cylindrical surface of the seal cylinder 1. The outer lips 6 are lower in height and smaller in width towards the depth of the seal cylinder 1 so that the rubber plug can be inserted into the latter 1 with ease (not shown in detail in FIG. 1). Inner lips 7 are formed on the inner cylindrical surface of the rubber plug 3. Each of the inner lips is in the form of a ring protruded from the inner cylindrical surface of the rubber plug 3, and its inside diameter is smaller than the outside diameter of the electrical wire 2, so that the outer peripheral portion of the inner lip is pressed against the outer cylindrical surface (the insulating cover) of the electrical wire 2 when the latter 2 is inserted into the rubber plug 3.

The length of the water-proofing rubber plug 3 is so determined that, when the rubber plug 3 is engaged with the connector housing, its rear end portion (on the right side in FIG. 1) is exposed outside the seal cylinder 1. The rear end portion of the rubber plug 3 is shaped as follows: That is, it is extended rearward from the position which is slightly set back from the edge 1a of the opening of the seal cylinder while its diameter is gradually larger towards the rear end, and an annular groove 14 is formed in the rear end face of the rear end portion of the rubber plug 3 in such a manner that it is coaxial with the latter 3, it continues in the circumferential direction and it is smaller in width towards its bottom. The formation of the annular groove 14 divides the rear end portion of the rubber plug 3 into an inner cylinder 11 and an outer cylinder 16. In other words, the annular groove 14 is provided between the inner and outer cylinders 11 and 16, so that an external force applied to one of the inner and outer cylinders is scarcely transmitted to the other.

The outside diameter (R2) of the rear end of the outer cylinder 16 is much larger than the inside diameter (R1) of the seal cylinder 1. Hence, when the rubber plug is inserted into the seal cylinder 1 as much as required, the outer cylinder 16 is pressed against the edge 1a of the opening of the seal cylinder 1.

The inner cylinder 11 is extended rearward substantially to the same position as the outer cylinder 16, and the former 11 is smaller in wall thickness than the latter 16 so that it suitably follows the deflection of the electrical wire 2. In addition, the inner cylinder 11 has an inner lip 12 along the opening at the rear end. The inner lip 12 is sealingly brought into close contact with the electrical wire 2.

When the electrical wire 2 with the water-proofing rubber plug 3 and the metal terminal (not shown) is inserted into the cavity of the connector housing, the positional relationships between the water-proofing rubber plug 3 and the seal cylinder 1 are as shown in FIG. 1. That is, the water-proofing rubber plug 3 is positioned inside the seal cylinder 1, and the outer lips 6 are held pressed against the inner cylindrical surface of the seal cylinder 1 while the inner lips 7 against the outer cylindrical surface of the electrical wire 2. In this case, when the outer cylinder 6 is halfway inserted into the seal cylinder 1, it is deformed inwardly; i.e., towards the annular groove, thus being pressed against the edge 1a of the opening of the seal cylinder 1. The rear end portions of the inner and outer cylinders 11 and 16 are protruded from the opening of the seal cylinder 1, thus being exposed outside.

In the case where the electrical wire 2 is bent near the edge 1a of the opening of the seal cylinder 1, the inner cylinder 11 deforms following the electrical wire 2 thus bent; that is, it is kept in close contact with the latter 2. In this case, because of the presence of the annular groove 14 the bending of the inner cylinder 11 scarcely affects the outer cylinder 16. That is, the bending force is scarcely applied to the wall of the outer cylinder 16 on the side to which the inner cylinder 11 is bent; that is, the wall of the outer cylinder 16 on the side is scarcely compressed. Hence, the wall of the outer cylinder 16 on the opposite side will never leave the edge 1a of the opening of the seal cylinder 1; that is, it is kept pressed against it as required. Thus, the outer cylinder 16 is kept pressed against the edge 1a of the opening being fully in close contact with the latter. Therefore, even when a bending force acts on the electrical wire 2, a gap is scarcely formed between the outer cylinder 16 and the edge 1a of the opening of the seal cylinder. In addition, the inner cylinder 11 is held water-tight on the electrical wire 2 by means of the inner lips 12, so that the seal cylinder is maintained high in water-tightness. If the electrical wire 2 is bent through a large angle, then the inner cylinder 11 may have a gap on the side which is opposite to the side to which the electrical wire has been bent. However, the embodiment is practically free from this difficulty, because the inner cylinder 11 is protruded backwardly of the seal cylinder 1 to a predetermined length so that its sealing portion is sufficiently long.

Second Embodiment

Figure 2:
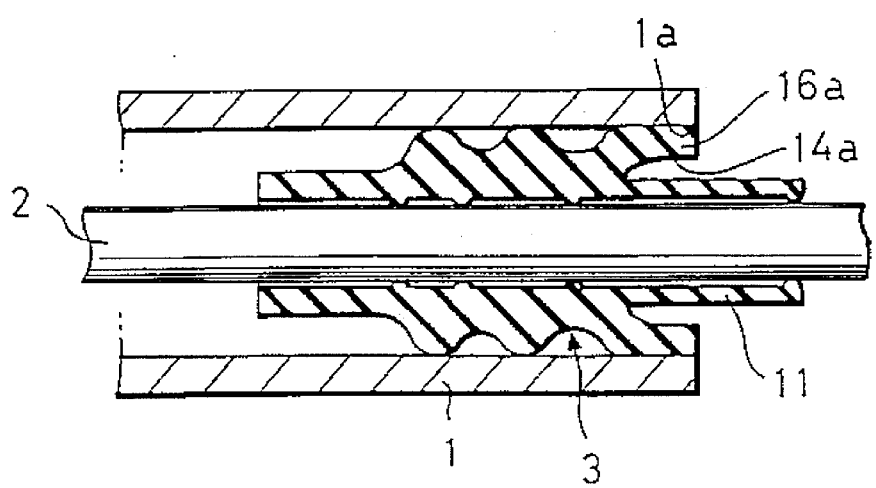
FIG. 2 is a sectional view showing another rubber plug engaged with the water-proof connector according to a second embodiment of this invention.

In the above-described first embodiment, the outer cylinder 16 is protruded outside from the edge 1a of the opening of the seal cylinder 1. The outer cylinder 16 may be modified into one 16a as shown in FIG. 2, which constitutes a second embodiment of the invention. That is, in the second embodiment, the outer end face of the outer cylinder 16a is flushed with the edge 1a of the opening of the seal cylinder 1. In this case, the annular groove 14a is formed to a depth that a force acting on the inner cylinder 11 is scarcely transmitted to the outer cylinder 16, and the outer cylinder 16a is so formed that its outer cylindrical surface is suitably pressed against the inner cylindrical surface of the seal cylinder 1.

Third Embodiment

Figure 3:
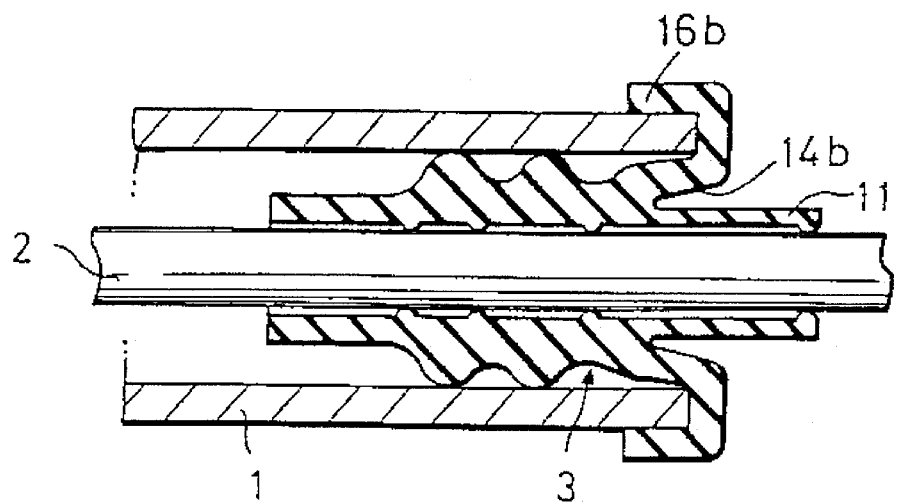
FIG. 3 is a sectional view showing another rubber plug engaged with the water-proof connector according to a third embodiment of this invention.

Furthermore, the outer cylinder may be modified into one 16b as shown in FIG. 3, which constitutes a third embodiment of the invention. That is, the outer cylinder 16b is folded, like an umbrella, over the outer cylindrical surface of the seal cylinder 1. In the third embodiment too, an annular groove 14b is formed between the outer cylinder 16b and the inner cylinder 11 so that the force applied to the inner cylinder 11 by the electrical wire 2 is scarcely transmitted to the outer cylinder 11.

Fourth Embodiment

Figure 4:
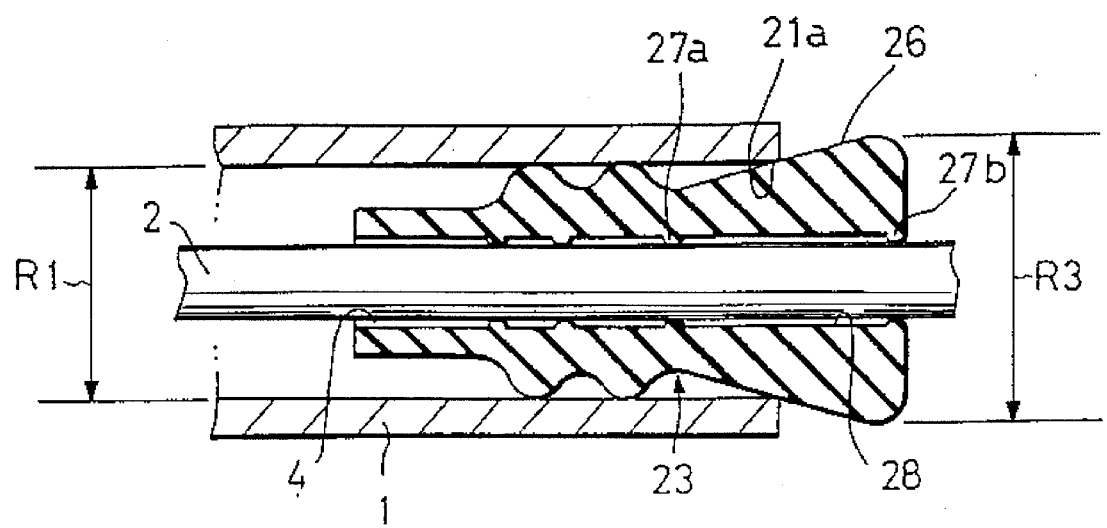
FIG. 4 is a sectional view showing another rubber plug engaged with the water-proof connector according to a fourth embodiment of this invention.

FIG. 4 shows a fourth embodiment of the invention. The fourth embodiment is different from the first embodiment only in the structure of the portion of its water-proofing rubber plug which portion is positioned near the opening of the seal cylinder. Hence, the fourth embodiment will be described with reference mainly to the structure of the portion.

In the fourth embodiment, unlike the above-described first through third embodiments, the rear end portion of its water-proofing rubber plug 23 is not divided into an inner cylinder and an outer cylinder, and instead it is a solid one which is gradually larger in diameter towards the rear end, having a taper surface 26. That is, similarly as in the first embodiment, the outside diameter (R3) of the rear end face of the rubber plug 23 is larger than the inside diameter (R1) of the seal cylinder 1. Hence, when the water-proofing rubber plug 23 is inserted into the seal cylinder 1, its rear end portion is positively pressed against the whole edge 21a of the opening of the seal cylinder 1 under a predetermined pressure by its elastic force. In the fourth embodiment, the rear end portion of the rubber plug is larger in thickness than in the first embodiment, and accordingly the force of pressing it against the edge 21 of the opening is higher. On the other hand, a hole 28 is formed in the water-proofing rubber plug 23 which is extended axially and communicated with the hollow 4. Inner lips 27a and 27b are formed on the inner cylindrical surface of the hole 28 which are sufficiently spaced away from each other, so that the electrical wire 2 is sealingly held in the hole 28.

The fourth embodiment is designed as described above. Hence, when the electrical wire 2 is bent laterally to one side, then a compressing force due to the bending of the electrical wire 2 is applied to the edge of the opening 21a of the seal cylinder 1 on the side to which the electrical wire 2 has been bent. In this case, the reaction from the edge 21 of the opening is great, and therefore the rear end portion of the rubber plug 23 is scarcely deformed by the compressing force due to the bending of the electrical wire. Accordingly, the rear end portion of the rubber plug 23 scarcely leaves the edge 21a of the opening on the other side which is opposite to the one side to which the electrical wire has been bent. Thus, the seal cylinder is sealed with the rear end portion of the rubber plug 23 at all times. In addition, since the inner lips 27a and 27b are sufficiently spaced away from each other, a gap is scarcely formed between the electrical wire 2 and the inner lip 27a in the back of the rubber plug. Thus, the electrical wire is held water-tight in the rubber plug.

As is apparent from the above description, the fourth embodiment is advantageous as follows: Even when a bending force is applied to the electrical wire 2, the taper surface 26 is abutted against the edge of the opening 21a under a sufficiently high pressure, and therefore a gap is scarcely formed between them. Furthermore, the electrical wire 2 is held water-tight in the rear end portion of the rubber plug with the aid of the inner lip 27a located in the back of the latter. Thus, the seal cylinder is held sufficiently waterproof.

The rear end portion of the water-proofing rubber plug 23 is simple in structure; that is, the fourth embodiment is obtained merely by giving the taper surface 26 to the rear end portion of the rubber plug which is gradually larger in diameter towards the rear end, yet the rear end portion thus formed provides a considerably high water-proofing function.

In addition, by sufficiently pressing the rear end portion of the water-proofing rubber plug 3 or 23 against the seal cylinder to positively seal the latter, the outer lips 6 may be eliminated.

Fifth Embodiment

Figure 5:
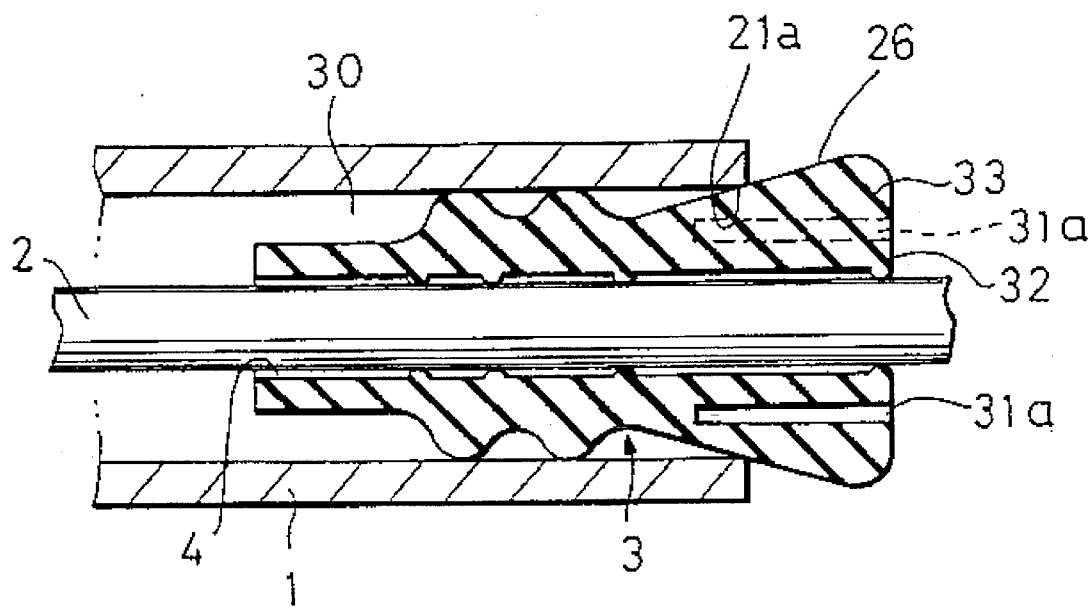
FIG. 5 is a sectional view showing another rubber plug engaged with the water-proof connector according to a fifth embodiment of this invention.
Figure 6:
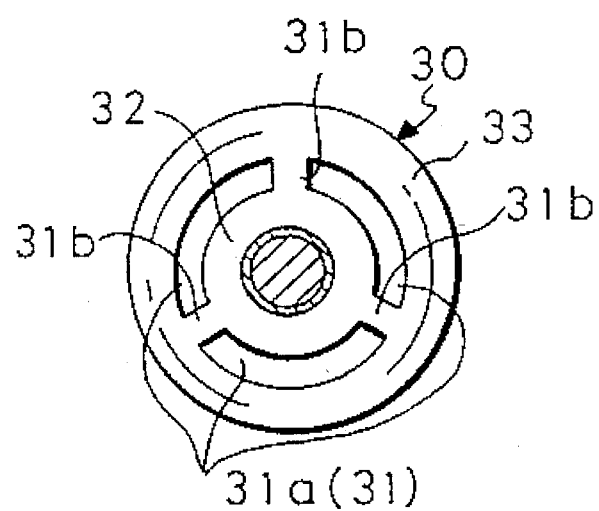
FIG. 6 is a side view form the back end surface of the rubber plug according to the fifth embodiment.
Figure 7:
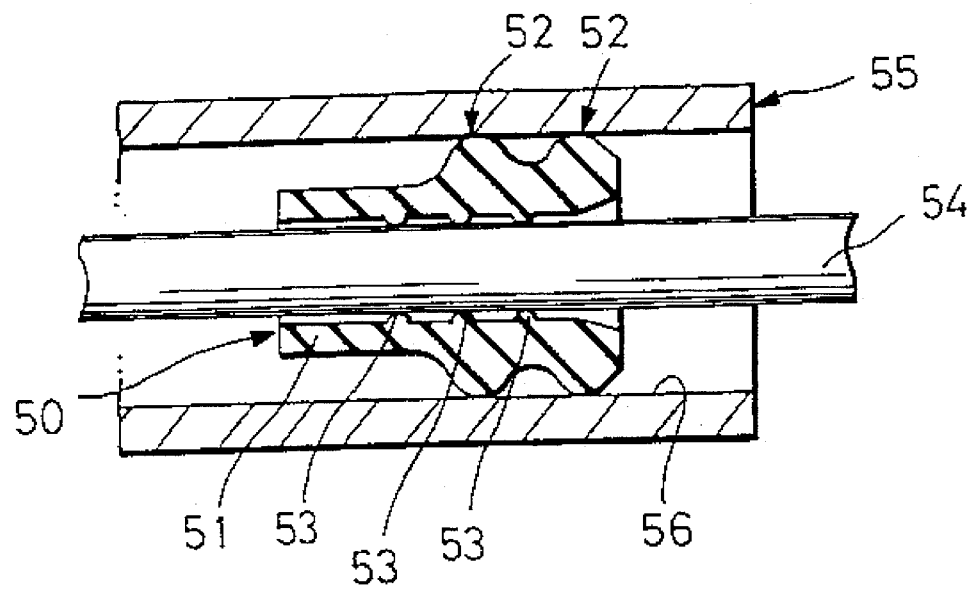
FIGS. 7 and 8 are sectional views for a description of a conventional rubber plug for a water-proof connector.
Figure 8:
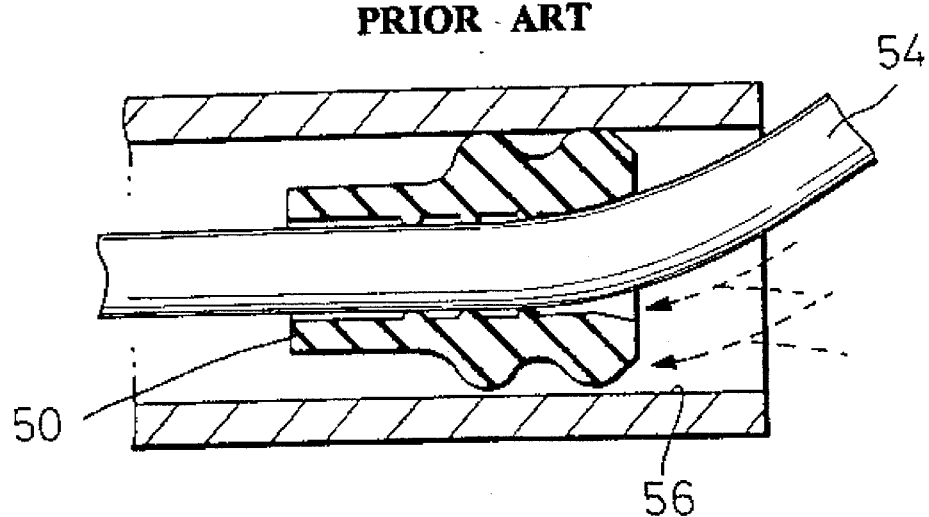

FIGS. 5 and 6 show a rubber plug according to a fifth embodiment of the present invention. The rubber plug, which has a taper surface abutted against the edge 21a of an opening of a seal cylinder 30 the similar with the fourth embodiment, is modified in following features: The rear end face of the rubber plug 30 has an annular groove 31. More specifically, the annular groove 31 comprises three divisional grooves 31a as shown in FIG. 6. The annular groove 31 is arranged coaxially with the seal cylinder 30. The divisional grooves 31a of the annular groove 31 are arranged on a circumference and at the equivalent angular interval. Each of the divisional grooves 31a is formed such that the width of the divisional groove 31a equals till the bottom. Under the constitution described above, the inner area divided by the divisional grooves 31a serves as an inner cylinder 32 and the outer area divided by the divisional grooves 31a serves as an outer cylinder 33. The inner cylinder 32 of the fifth embodiment is restrained in part by the outer cylinder through connecting pieces formed between the divisional grooves 31a in contrast to the first embodiment. Therefore, the strength of the inner cylinder 32 increases and the deformation thereof is suppressed in contrast to the first embodiment, in which the annular groove continues along the whole circumference.

According to the fifth embodiment, when the electrical wire is bent laterally, the outer cylinder 33 receives little influence thereby and sealing is kept by the taper surface 26 because the inner cylinder 32 and the outer cylinder 33 is almost divided from each other. Furthermore, when the electrical wire 2 is inserted into a hollow 4, the undesirable deformation of the inner cylinder 32 is suppressed because the strength of the inner cylinder 32 increases, therefore the inserting operation can be smoothly performed.

The number of divisional grooves may be suitably determined, it is no limited thereby nor thereto.

What is claimed is:

1. A rubber plug for a water-proof connector, said rubber plug having an electrical wire inserted therein, said rubber plug being inserted into a cylindrical structure of the water-proof connector to sealingly close a gap between the electrical wire and the cylindrical structure, said rubber plug comprising:

a first end that projects inside said cylindrical structure, the first end being a distal end of the rubber plug; and a second end, opposite said first end, that projects towards an opening of the cylindrical structure, said second end including:

an inner cylinder provided adjacent the opening of the cylindrical structure of the water-proof connector for sealingly closing a gap between the electrical wire and said inner cylinder, and an outer cylinder provided at least partially inside the cylindrical structure and outside said inner cylinder such that said outer cylinder surrounds said inner cylinder with an annular groove formed therebetween, said outer cylinder closing a gap between an inner cylindrical surface of the cylindrical structure and said outer cylinder.

2. A rubber plug according to claim 1, wherein said second end includes a tapered outer surface which is gradually larger in diameter towards the opening of said cylindrical structure, said tapered surface being pressed against an edge of the opening of the cylindrical structure.

3. A rubber plug according to claim 2, wherein said annular groove is divided into a plurality of divisional grooves.

4. A rubber plug according to claim 1, wherein said annular groove is divided into a plurality of divisional grooves.

5. A rubber plug for a water-proof connector, said rubber plug having an electrical wire inserted therein, said rubber plug being inserted into an opening of a cylindrical structure of the water-proof connector to sealingly close a gap between the electrical wire and the cylindrical structure, said rubber plug comprising:

a gripping section for gripping the electrical wire adjacent an edge of the opening of the cylindrical structure; and a tapered surface provided adjacent the edge of the opening of said cylindrical structure, said tapered surface being gradually larger in diameter towards the opening of the cylindrical structure such that the diameter of the tapered surface exceeds a diameter of the opening and presses against the edge of said opening of the cylindrical structure.

6. A rubber plug for a water-proof connector, said rubber plug being inserted into a cylindrical structure of the water-proof connector, said rubber plug comprising:

a first end that projects inside said cylindrical structure, the first end being a distal end of the rubber plug; and a second end, opposite said first end, that projects towards an opening of the cylindrical structure, said second end including:

an inner cylinder provided adjacent the opening of the cylindrical structure of the water-proof connector, and an outer cylinder provided at least partially inside said cylindrical structure and outside said inner cylinder such that said outer cylinder surrounds said inner cylinder with an annular groove formed therebetween.

* * * * *